March 2, 1926.                B. F. PEARSON                    1,575,275
                               CAKE TURNER
                             Filed July 10, 1924
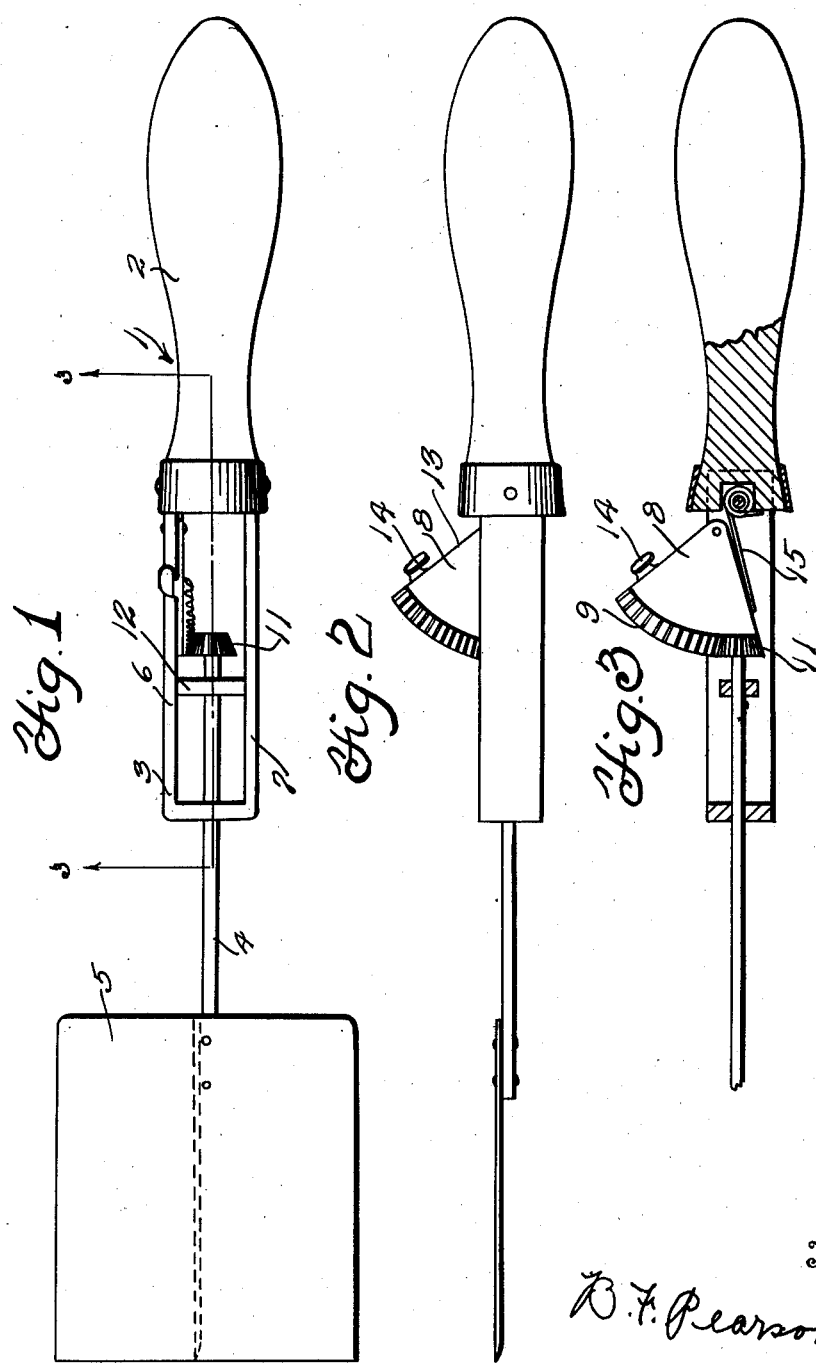

Patented Mar. 2, 1926.

1,575,275

UNITED STATES PATENT OFFICE.

BENJAMIN F. PEARSON, OF ASHEVILLE SCHOOL, NORTH CAROLINA.

CAKE TURNER.

Application filed July 10, 1924. Serial No. 725,210.

*To all whom it may concern:*

Be it known that I, BENJAMIN F. PEARSON, a citizen of the United States, residing at Asheville School, in the county of Buncombe and State of North Carolina, have invented certain new and useful Improvements in Cake Turners, of which the following is a specification.

This invention relates to culinary articles and has for its object to provide improvements in cake turners.

Another object of the invention is to provide in a cake turner a revoluble plate.

Another object of the invention is to provide in a cake turner a plate for receiving the cake and means whereby the same may be revolved to turn the cake on the griddle.

With the above and other objects in view I have invented the device illustrated in the accompanying drawings in which:

Figure 1 is a top plan view of my improved cake turner.

Figure 2 is a side elevational view thereof and

Figure 3 is a view similar to Figure 2 partly in section, and partly broken away.

Like references indicate like parts through the following specification and in the several views in the drawings in which 1 indicates a cake turner embracing a handle 2 a frame 3 a shank 4 pivotedly mounted on said frame and a cake receiving plate 5 fixed to the free end of such shank. Pivotedly mounted between the sides 6 and 7 of the frame 3 is a segment 8 having a segmental rack 9 on its outer end which rack is a mesh with a beveled gear which is mounted on the inner end of the shank 4. Adjacent the transverse bearing member 12 of said frame, projecting from the upper edge 13 of the segment 8 is a thumb piece 14 against which the thumb of the user will rest. The segment 8 is normally held in its uppermost position as shown in Figures 2 and 3, by means of a spring 15. However upon pressure of the thumb piece 14 the segment 8 is operated against the tension of said spring 15 and caused to be shoved down between the sides 6 and 7 of said frame 3 which action causes its rack 9 operating upon the bevel 11 to rotate the shank 4 whereby the plate 5 will be completely turned over, which action will turn the cake which has been lifted upon said plate and deposit the same again upon griddle. The limit of movement of member 8 is just sufficient to reverse the position of the plate 5 and then stop further movement in one direction thereof.

Having described my invention that which I claim to be new and desire to procure by Letters Patent is:

1. In a cake turner, the combination of a shank carrying a cake receiving plate, a handle provided with a U-shaped end, the shank penetrating the base of the U-shaped end and supported in the U-shaped end, and means carried by the U-shaped end for rotating the shank.

2. In a cake turner, a cake receiving plate provided with a shank, a handle, a bar bent in U form with the sides of the U substantially co-planer with the edge of the handle, and means for rotating the shank.

3. In combination in a cake turner, a cake receiving plate provided with a shank, a handle, a ferrule carried at the end of the handle, a bar bent in U form, the ends of the bar anchored to the handle beneath the ferrule, the shank carried by the U shaped bar and means for rotating the shank.

4. In combination in a cake turner, a handle, a cake receiving plate provided with a shank, a ferrule carried by the handle, a bar bent in U form and connected to the handle by the ferrule, a cross bar between the sides of the U bar, the shank revolubly supported by the base of the U and the cross bar, and means for rotating the shank.

5. In combination in a cake turner, a handle, a U-shaped extension forming a part thereof, a turning plate provided with a shank, the shank journalled between the sides of said extension, and means between the sides including a rack and gear for rotating the plate.

In testimony whereof I affix my signature.

BENJAMIN F. PEARSON.